United States Patent [19]
Takayama et al.

[11] Patent Number: 6,004,031
[45] Date of Patent: Dec. 21, 1999

[54] TEMPERATURE MEASURING DEVICE

[75] Inventors: Takamitsu Takayama; Zenkichi Yamanaka; Yoshiro Yamada; Yasushi Kaneda, all of Kawasaki, Japan

[73] Assignee: NKK Corporation, Tokyo, Japan

[21] Appl. No.: 08/743,549

[22] Filed: Nov. 4, 1996

Related U.S. Application Data

[62] Division of application No. 08/310,227, Sep. 21, 1994, abandoned.

[30] Foreign Application Priority Data

Nov. 30, 1993 [JP] Japan ................................ 5-299530

[51] Int. Cl.$^6$ .............................. G01K 13/00; G01J 5/08
[52] U.S. Cl. ........................... 374/131; 374/140; 266/99
[58] Field of Search ....................... 374/140, 131; 266/99, 88

[56] References Cited

U.S. PATENT DOCUMENTS

| | | | |
|---|---|---|---|
| 4,093,193 | 6/1978 | Cassidy et al. | 266/87 |
| 5,078,507 | 1/1992 | Koller | 374/131 |
| 5,164,999 | 11/1992 | Shifflett | 374/131 |
| 5,364,186 | 11/1994 | Wang et al. | 374/131 |

FOREIGN PATENT DOCUMENTS

| | | | |
|---|---|---|---|
| 1574054 | 7/1969 | France . | |
| 2289888 | 5/1976 | France . | |
| 1648246 | 7/1971 | Germany . | |
| 52-76086 | 6/1977 | Japan . | |
| 0107378 | 9/1978 | Japan | 374/140 |
| 55-149814 | 11/1980 | Japan . | |
| 58-167925 | 10/1983 | Japan . | |
| 58-189527 | 11/1983 | Japan . | |
| 60-129628 | 7/1985 | Japan . | |
| 61-6737 | 1/1986 | Japan . | |
| 61-6433 | 2/1986 | Japan . | |
| 61-91529 | 5/1986 | Japan . | |
| 62-19727 | 1/1987 | Japan . | |
| 62-132135 | 6/1987 | Japan . | |
| 62-185129 | 8/1987 | Japan . | |
| 62-226025 | 10/1987 | Japan . | |
| 63-81264 | 4/1988 | Japan . | |
| 63-214627 | 9/1988 | Japan . | |
| 4-329323 | 11/1992 | Japan . | |
| 4-348236 | 12/1992 | Japan . | |
| 5-142049 | 6/1993 | Japan . | |
| 5-248960 | 9/1993 | Japan . | |
| 6-58816 | 3/1994 | Japan . | |
| 1492268 | 11/1977 | United Kingdom . | |

OTHER PUBLICATIONS

English Abstract of JP 62–19727, Published Jan. 28, 1997.

*Primary Examiner*—Diego Gutierrez
*Attorney, Agent, or Firm*—Frishauf, Holtz, Goodman, Langer & Chick, P.C.

[57] ABSTRACT

A temperature measuring device includes an optical fiber, a metallic protective tube covering the optical fiber, and a heat insulation coating covering the metallic protective tube such that the optical fiber is covered with the metallic protective tube and the heat insulation coating to form a double-covered optical fiber. The heat insulation coating contains carbon particles as an additive. In addition, a radiation thermometer is connected to the double-covered optical fiber, and a tip of the double-covered optical fiber forms a temperature measuring element for collecting and transmitting radiation to the radiation thermometer.

9 Claims, 14 Drawing Sheets

TEMPERATURE MEASURING DEVICE

This is a division of application Ser. No. 08/310,227 filed Sep. 21, 1994, now abandoned.

BACKGROUND OF THE INVENTION

1. Field of the Invention

The present invention relates to a temperature measuring device and a level measuring device using the temperature measuring device.

2. Description of the Related Arts

In a continuous casting process, for example, accurate measurement of temperature and surface level of molten steel during casting is necessary for improving the product quality and the production yield. A conventional technique for measuring the temperature of molten steel in a tundish and a mold involves preparing a solidification chamber inside of a carbon sleeve to introduce the molten steel, and determining the temperature in the solidification chamber using a contact thermometer of a consumable immersion thermocouple type a thermocouple covered with a ceramic protective tube. As for the method to determine the level of molten steel, conventional art uses an eddy-current distance detector.

The above-described consumable immersion thermocouple degrades after only one measurement because it directly contacts the molten steel. Therefore, the probe to measure the temperature is detachable at the tip of the thermometer, and the tip probe is replaced in every measurement. Since such probes are expensive and are discarded in every measurement, an increase of the number of measurements is difficult.

In the case that the thermocouple is covered with a ceramic tube, the thermocouple does not contact directly with the molten steel. Consequently, a continuous measurement is possible. In this case, however, the durability of ceramic protective tube has a limitation because of heat shock and erosion caused by slag. As a result, even if an expensive protective tube is used, it is generally durable only to 40 to 50 hrs., and repeated use for a long time is impossible.

Still further, with respect to the eddy-current distance detector which is used to determine the level of molten steel, it is useful to achieve level control in accordance with a precise measurement under a steady state condition. The conventional range of measurement, however is as narrow as 200 mm or less, so such detectors can not be used to determine the level during automatic start-up. Consequently, an automatization to achieve an automatic start-up mode is difficult.

SUMMARY OF THE INVENTION

It is an object of the invention to provide a temperature measuring device which accurately determines the temperature of molten metal at an elevated temperature and to provide a level measuring device which determines an arbitrary level using the temperature measuring device.

The present invention provides a temperature measuring device comprising:

(a) an optical fiber;
(b) a metallic protective tube for covering the optical tube to form a metal-covered optical fiber, a tip of the metal-covered optical fiber being a temperature measuring element; and
(c) a radiation thermometer connected to the metal-covered optical fiber.

Moreover, the present invention provides a level measuring device comprising:

(a) an optical fiber;
(b) a metallic protective tube for covering the optical tube to form a metal-covered optical fiber, a tip of the metal-covered optical fiber being a temperature measuring element;
(c) a radiation thermometer connected to the metal-covered optical fiber;
(d) transfer means for sending the metal-covered optical fiber to a surface of a molten metal to be measured and retracting to wind the metal-covered optical fiber from the surface; and
(e) level determination means for determining a level of the surface of the molten metal based on a temperature change detected by the radiation thermometer and an amount of feed of the optical fiber through the transfer means.

The present invention provides another temperature measuring device comprising:

(a) an optical fiber;
(b) a protective tube for covering the optical fiber;
(c) a heat insulation coating for covering the protective tube, the optical fiber being covered with the protective tube and the heat insulation coating to form a double-covered optical fiber, and a tip of the double-covered optical fiber being a temperature measuring element;
(d) the optical fiber having a corrosion temperature of higher than a temperature of a molten metal to be measured; and
(e) the protective tube and the heat insulation coating having a heat resistant temperature of lower than a temperature of the molten metal to be measured.

The present invention provides still another temperature measuring device comprising:

(a) an optical fiber;
(b) a metallic protective tube for covering the optical fiber;
(c) a heat insulation coating for covering the protective tube, the optical fiber being covered with the protective tube and the heat insulation coating to form a double-covered optical fiber, and a tip of the double-covered optical fiber being a temperature measuring element; and
(d) said heat insulation coating containing particles as an additive having a melting point higher than a temperature of a molten metal to be measured.

The present invention provides yet another temperature measuring device comprising:

(a) an optical fiber;
(b) a metallic protective tube for covering the optical fiber, and
(c) a heat insulation coating for covering the metallic protective tube, the heat insulation coating comprising cellulose.

DESCRIPTION OF THE EMBODIMENT

Embodiment-1

Figure 1:
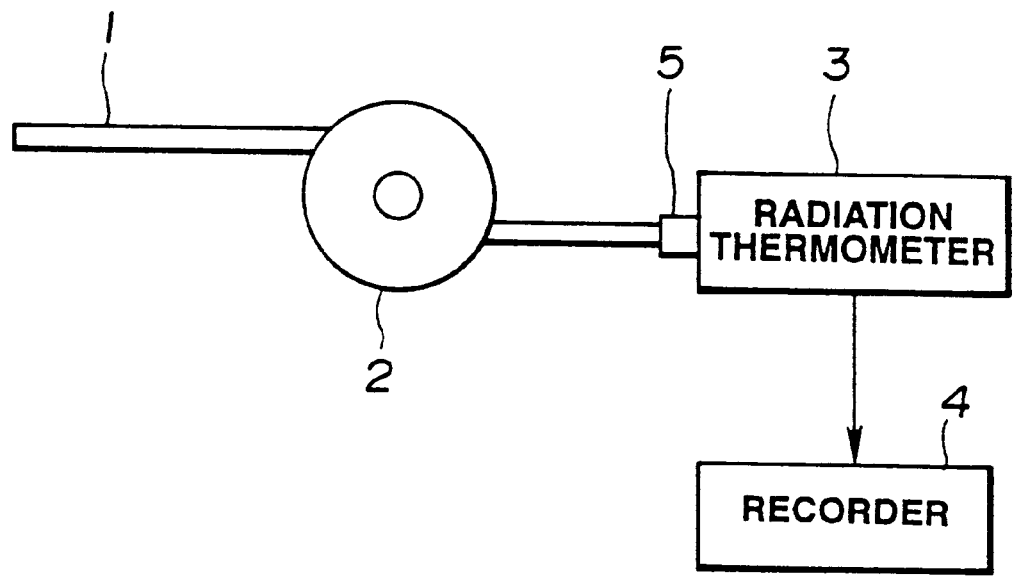
FIG. 1 shows an embodiment of the present invention.

A temperature measuring device of the present invention for molten metal comprises a metal-covered optical fiber which is covered with a metallic tube and a radiation thermometer which is connected to the metal-covered optical fiber, wherein the metal-covered optical fiber functions as a temperature measuring element at the tip thereof.

Furthermore, a level measuring device of the present invention for molten metal comprises: a metal-covered optical fiber covered with a metallic tube, wherein the metal-covered optical fiber functions as a temperature measuring element at the tip thereof; a radiation thermometer connected to the metal-covered optical fiber, transfer means to send the metal-covered optical fiber to the surface of the molten metal and also to retract to wind the metal-covered optical fiber from the surface of the molten metal; and level determination means to determine a molten metal surface level based on a temperature change detected by the radiation thermometer and a feed amount of the metal-covered optical fiber by immersing the optical fiber into the molten steel.

According to the present invention, the tip of the metal-covered optical fiber is immersed into a molten metal as the temperature measuring element. The coating of an ordinary optical fiber catches fire when the tip of the optical fiber approaches the surface of the molten metal, and the ordinary optical optical fiber itself easily snaps at the moment of immersing into the molten metal so that it can not be dipped into the molten metal. However, since the optical fiber of the present invention is covered with a metal tube, it is immersed into the molten metal without damaging itself.

The metallic tube covering the optical fiber is usually made of a stainless steel having a melting point ranging from 1400 to 1430° C. Consequently, when the tip of the optical fiber covered with the metallic tube is immersed into the molten metal, the metallic tube dose not melt for several seconds and protects the optical fiber. The optical fiber which itself forms the core has a heat durability by preparing it with a quartz glass which has a softening point of 1600° C. or higher.

When the tip of the optical fiber covered with metallic tube is immersed into a molten metal, the tips of the metallic tube and the optical fiber attain the same temperature as that of the molten metal, and the tip of the optical fiber satisfies the condition of black body. Accordingly, the tip of the optical fiber is not affected by its shape, and emits radiation light dependent only on the temperature. The radiation light is introduced to the radiation thermometer via the optical fiber, and the temperature of the molten metal is determined by the radiation thermometer.

In addition, when the tip of the metal-covered optical fiber covered with metallic tube is bent to have a near U-shape, a direct incident light of radiation light of the molten metal is prevented from coming into the tip of the optical fiber before immersing the metal-covered optical fiber into the molten metal.

Furthermore, transfer means for feeding the optical fiber sends the metal-covered optical fiber onto the surface of the molten metal to immerse it into the molten metal, and then the means winds the released optical fiber to draw up from the molten metal.

Level determination means is provided to determine the level of the molten metal based on a temperature change detected by the radiation thermometer and on an amount of feed of the optical fiber through the transfer means to send the optical fiber.

Figure 2:
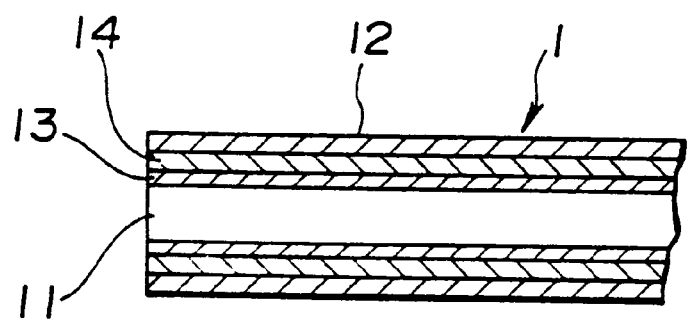
FIG. 2 shows a cross section of a covered optical fiber which is covered with a metallic tube of the present invention.

FIG. 1 shows a schematic drawing of an embodiment of the present invention. According to the drawing, the temperature measuring device to measure the temperature of, for example, molten steel, has a metal-covered optical fiber 1 coiled on a feed drum 2, a radiation thermometer 3, and a recorder 4. The metal-covered optical fiber 1 covered with a metallic tube includes, as shown in FIG. 2, an optical fiber 11 made of quartz glass covered with a metallic tube 12 made of stainless steel. A jelly 14 is filled between a cover layer 13 on the optical fiber 11 and the metallic tube 12, as required. The metal-covered optical fiber 1 functions as a light guide and also as a temperature measuring element. The tip of the metal-covered optical fiber is immersed into the molten steel. A radiation thermometer 3 detects and indicates the temperature of the molten metal based on the radiation light emitted from the tip of the metal-covered optical fiber 1. The radiation thermometer 3 comprises an infrared radiation thermometer which directly determines the temperature from the luminance output of radiation light, and a two-color pyrometer which determines the temperature by comparing the luminance at two different wavelengths. The radiation thermometer is connected to the metal-covered optical fiber 1 via an optical fiber connector 5.

To determine the temperature of the molten steel using the temperature measuring device, the tip of the metal-covered optical fiber 1 is immersed into the molten steel. If an ordinary optical fiber having only a coating layer were immersed into the molten steel, the coating layer would catch on fire before reaching the surface of the molten steel, and the optical fiber snaps when it touches the surface of molten steel. Since the metal-covered optical fiber 1 is protected by the metallic tube 12, the optical fiber 11 and the coating layer 13 are not damaged while immersing them into the molten steel. The metallic tube 12 covering the optical fiber 11 is made of stainless steel having a melting point ranging approximately from 1400 to 1430° C., so the metallic tube does not immediately melt even when it is immersed into a high temperature molten steel, and protects the optical fiber 11 for several seconds. Also since the optical fiber comprises a core which is prepared from quartz glass having a softening point of 1600° C. or higher, it holds its original shape without melting.

Once the tip of the metal-covered optical fiber 1 is immersed into a molten steel, the tips of the metallic tube 14 and the optical fiber 11 attain the same temperature as that of the molten steel, and the tip of the optical fiber 11 satisfies the condition of black body. Then the tip of the optical fiber 11 thus emits radiation light which depends only on the temperature. The radiation light is sent to the radiation thermometer 3 via the metal-covered optical fiber 1. The radiation thermometer 3 calculates the temperature based on the wavelength of received radiation light and determines the temperature of the molten steel, and sends the temperature output signal to the recorder 4 to store the value. The immersion of the tip of the metal-covered optical fiber 1, which configuration gives a small heat capacity, allows for instantaneous follow up of the tip to the temperature of the molten steel and achieves a quick and accurate measurement of the temperature of the molten steel. A direct current style radiation light sent to the radiation thermometer 3 can be processed by a photo-chopper to be converted into an intermittent alternate current signal and amplified, and then the amplified alternate current signal can be detected by synchronizing with the photo-chopper to achieve a stable amplification.

When the tip of the metal-covered optical fiber 1 is kept immersed into the molten steel for a long time after detecting the temperature of the molten steel, the coating layer 13 of the optical fiber 11 becomes gaseous in the high temperature environment. Then, the generated gas is ejected from the tip of the optical fiber, and is ignited if oxygen is present. To prevent such an accident, the tip of the metal-covered optical fiber 1 is drawn up from the molten steel immediately after measuring the temperature of the molten steel. Then, the tip once used as the temperature measuring element is cut off before next temperature measurement cycle, and the fresh tip is immersed into the molten steel at the next measuring cycle. In this way, a coil of the metal covered optical fiber 1 is successively used to measure the molten steel temperature.

Now, some examples of temperature measurement for molten steel using a temperature measuring device structured as described above will be given.

Figure 3:
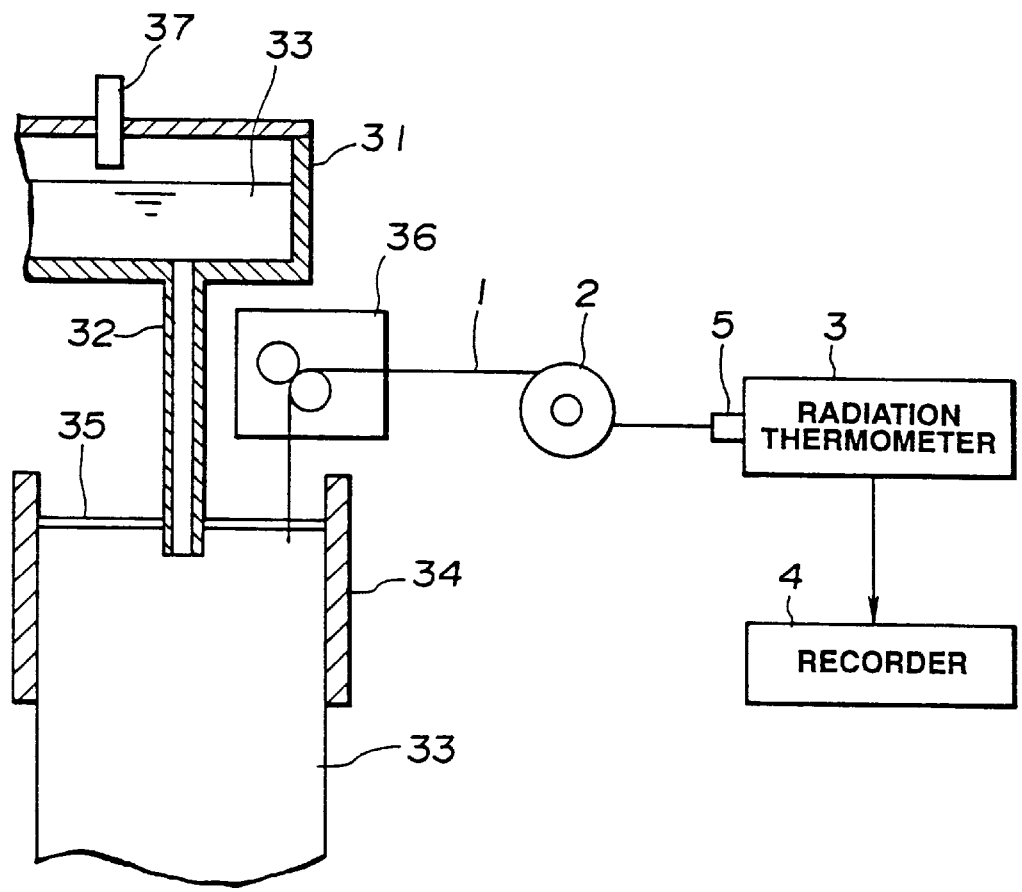
FIG. 3 illustrates a scheme of the present invention applied to a temperature measurement of molten steel in a mold of a continuous casting machine.
Figure 4:
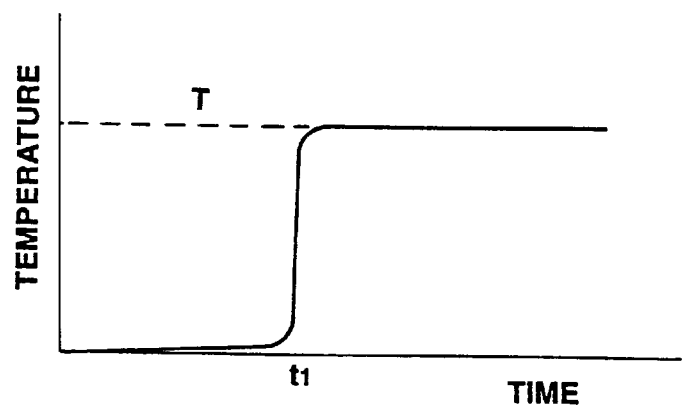
FIG. 4 is a graph showing a characteristic curve of optical fiber feed time and temperature change.

FIG. 3 illustrates a schematic diagram of temperature measurement for a molten steel in a mold of a continuous casting machine using the temperature measuring device described above. As seen in the figure, in the continuous casting machine, the molten steel 33 is poured into a mold 34 via the tundish 31 and the immersion nozzle 32. Normally, a powder 35 is spread on the molten steel 33 in the mold 34. To measure the temperature of the molten steel in the mold 34, the metal-covered optical fiber 1 covered with metallic tube coiled around the feed drum 2 is sent out at a certain speed using the fiber transfer means 36 in either a continuous manner or an intermittent manner, and the tip of the metal-covered optical fiber 1 is immersed into the molten steel 33 through the powder 35. In this manner, the temperature is determined by the radiation thermometer 3 while feeding the tip of the metal-covered optical fiber 1, and the determined temperature is recorded in the recorder 4 which shows. Then, as seen in FIG. 4, the characteristic curve of a fiber feeding time and a temperature change, the temperature shows a sudden rise to $t_1$ at the time when the tip of the metal-covered optical fiber 1 is immersed into the molten steel 33, and the temperature saturates at T of the molten steel 33. The detection of the saturated temperature allows the measurement of the temperature T of the molten steel 33.

Figure 5:
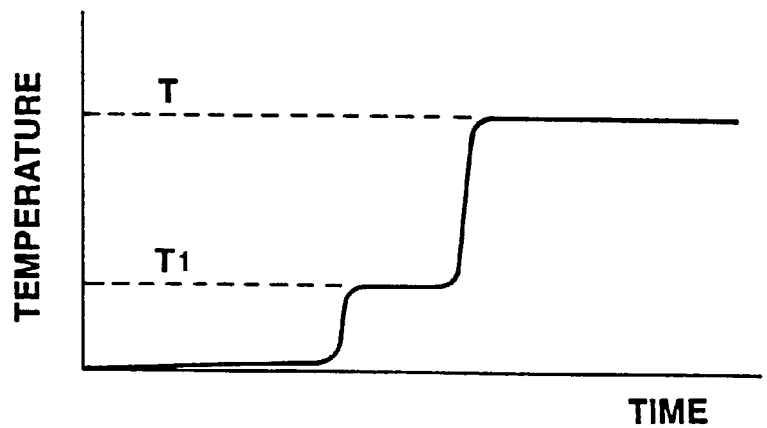
FIG. 5 is a graph showing a characteristic curve of optical fiber feed time and temperature change.

When the feed speed of the fiber transfer means 36 is controlled during feeding of the tip of metal-covered optical fiber 1, the temperature $T_1$ of the molten powder 35 is determined clearly and separately from the temperature T of the molten steel 33, as seen in FIG. 5 showing a temperature change characteristic graph. It is also possible to determine a temperature distribution of the molten steel 33 in its depth direction as well as the temperature $T_1$ of the molten powder 35. Nevertheless, a prolonged immersion of the metal-covered optical fiber results in the melting of the metallic tube 12 to melt the tip of the metal-covered optical fiber 1. Therefore, after completing the measurement, the fiber transfer means 36 starts its operation in a reverse direction to draw up the metal-covered optical fiber 1 at a high speed to wind around the feed drum 2 to prepare for the next measurement. With the repetition of the procedure described above, the temperature of the molten steel 33 in the mold 34 can be accurately determined.

During the measurement of the molten steel 33, a shortened dip depth of the metal-covered optical fiber 1 into the molten steel 33 and a shortened immersion time reduce the consumption of the metal-covered optical fiber 1. The immersion time depends on the time for the temperature measurement. The time necessary for measuring temperature is determined by a response time of the radiation thermometer 3, and is independent of the transmission of radiation light. When a semiconductor device is used as a light receptor of the radiation thermometer 3, the response time of the thermometer is the order of msec., which means that the consumption of the metal-covered optical fiber 1 is as small as approximately 1 cm in every measurement. As a result, the repeated measurement of the temperature of the molten steel 33 is performed at a low cost.

If the temperature determined by the repeated measurements falls to below a specified level, then the process can be stabilized by enhancing the heating with a plasma torch 37 to raise the temperature of the tundish 31.

Figure 6:
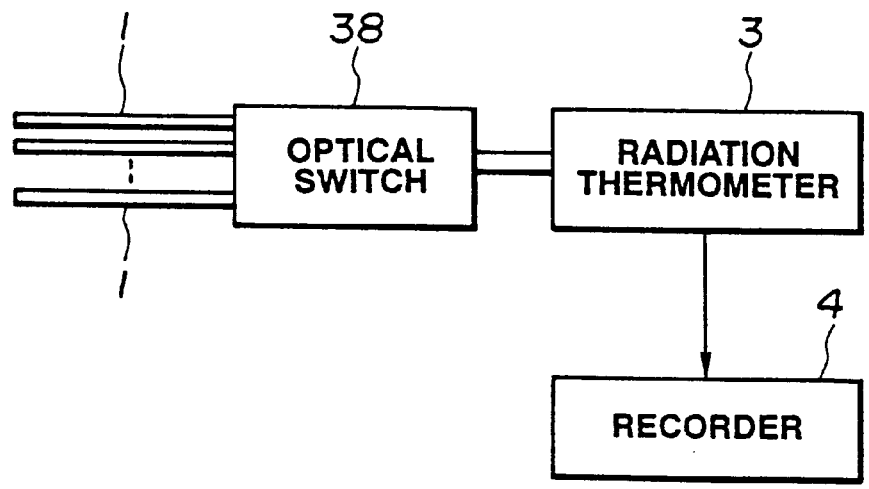
FIG. 6 illustrates another embodiment of the present invention.

The temperature distribution within the mold 34 is also determined by measuring the temperature of the molten steel 33 while changing the measuring points in the mold 34 and, as seen in FIG. 6, by using a multi-points thermometer combined with the radiation thermometer 3 and connected to more than one metal-covered optical fiber 1 via an optical switch 38. The obtained data of temperature distribution within the mold 34 allows to prediction of a flow rate distribution of molten steel coming from the nozzle 32, which information contributes to the stable operation of the continuous casting machine.

The above-described example deals with the measurement of temperature of the molten steel 33 in a mold 34. The level of the molten steel 33 can also be measured in accordance with the temperature of the molten steel 33 within the mold 34.

Figure 7:
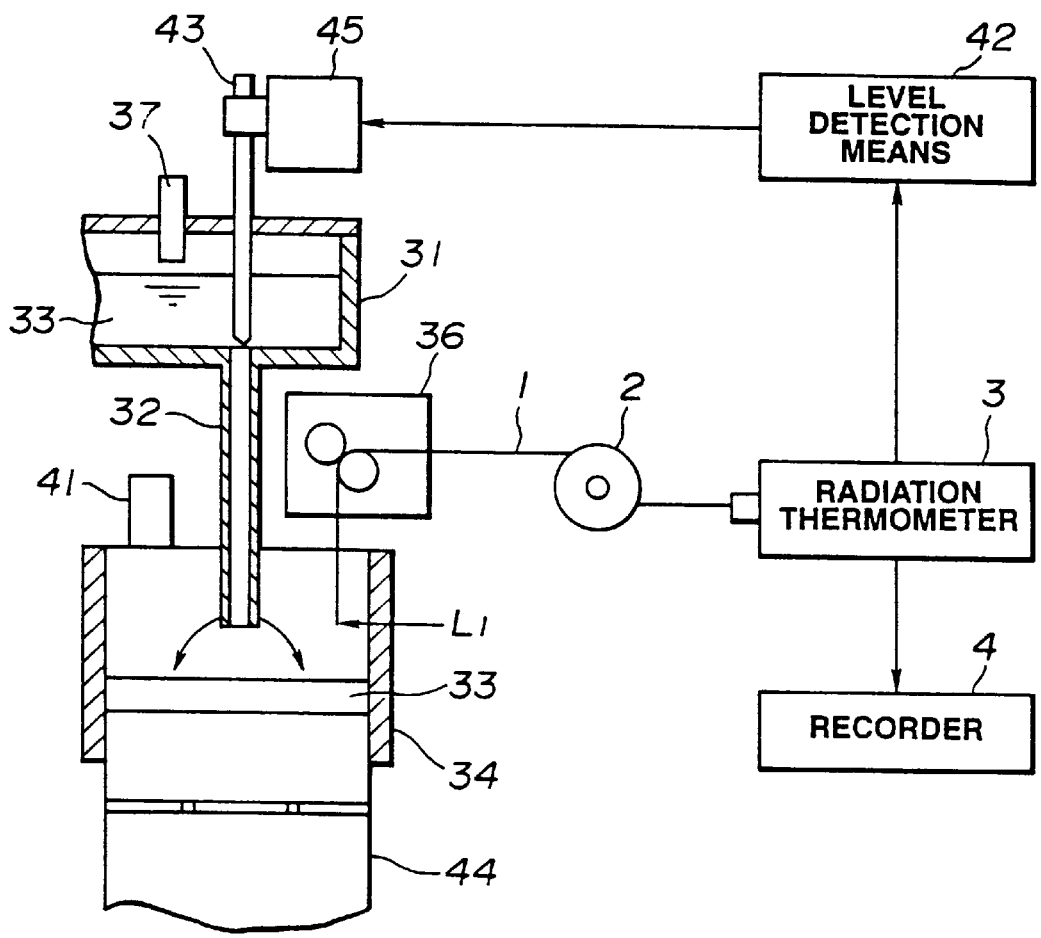
FIG. 7 illustrates a scheme of the present invention applied to a temperature and level measurement of molten steel in a mold of a continuous casting machine.

FIG. 7 illustrates a scheme for the measurement of temperature and a level of molten steel 33 in the mold 34 of a continuous casing machine. As seen in the figure, the level of the molten steel 33 in the mold 34 at a steady state is determined by a level detector 41 which comprises an eddy current distance detector. The tip of the metal-covered optical fiber 1 covered with metallic tube is placed at an initial level detection point $L_1$ in the mold 34. The temperature output terminal of the radiation thermometer 3 is connected to the level detection means 42. The level detection means 42 identifies the time when the molten steel 33 in the mold 34 reaches the initial level detecting point L1. A threshold value TH corresponding to the initial level detection point $L_1$ is entered to the level detection means 42 in advance.

Figure 8:
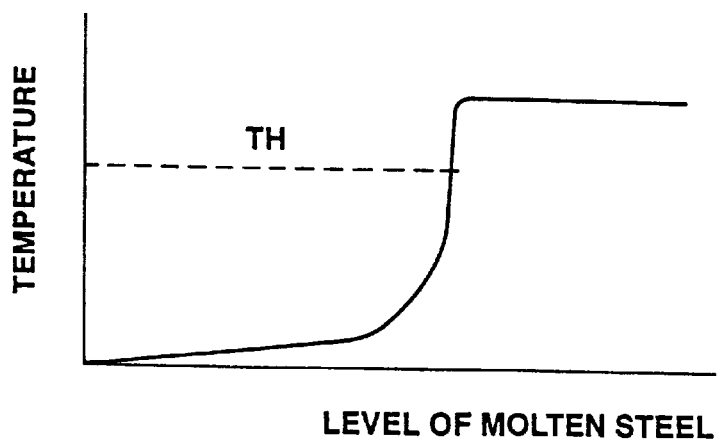
FIG. 8 is a graph showing a characteristic curve of molten steel level and temperature change.

When a nozzle stopper 43 is turned to open, the molten steel 33 in the tundish 31 is poured onto a dummy bar 44 through a nozzle 32, and a level of the molten steel 33 in the mold 34 rises. When the molten steel 33 approaches to the tip of the metal-covered optical fiber 1 at the initial detection point $L_1$, the radiation light emitted from the molten steel 33 and entered the metal-covered optical fiber 1 increases, and the temperature output of the radiation thermometer 3 gradually increases as shown in FIG. 8. The temperature output is sent to the level detection means 42. The level detection means 42 compares the temperature of the molten steel 33 with the threshold value TH. When the molten steel 33 touches the tip of the metal-covered optical fiber 1, the temperature output of the radiation thermometer 3 shows a rapid rise indicating the temperature of the molten steel 33. When the temperature information sent from the radiation thermometer 3 exceeds the threshold value TH, the level detection means 42 judges that the level of molten steel 33 has reached the initial level detection point $L_1$, and sends the initial level detection signal to nozzle stopper point control means 45. On receiving the initial level detection signal, the nozzle stopper point control means 45 adjusts the position of the nozzle stopper 43 to control the flow rate of the molten steel to that of the second stage. In addition, the initial level detection signal actuates the draw-out of the dummy bar 44 and the take-up of the metal-covered optical fiber 1 automatically. When the level of molten steel 33 in the mold 34 enters in a measuring range of an eddy current level detector 41, the level control of the molten steel is conducted using the output of the level detector 41. The repeated feeding and drawing up of the metal-covered optical fiber 1 allows to determine the temperature of the molten steel 33 in the mold 34.

Since the setting position of the tip of the metal-covered optical fiber 1 is arbitrarily selected at the detection of the initial level detection point $L_1$ in the molten steel 33 in the mold 34, the initial level detection point $L_1$ can be set in a wide range. Accordingly, an automatic start which was difficult using prior art techniques can be realized.

Also since the diameter of the metal-covered optical fiber 1 can be as thin as from 1 to 2 mm, it is applicable even for a continuous casting of small cross sectional billets and the industrial effect is significant.

The description given above uses an example of a single metal-covered optical fiber 1. However, as shown in FIG. 6, when the tips of more than one metal-covered optical fiber 1 are positioned at different levels, the level change of the molten steel 33 during the initial stage can be detected.

The description given above deals with the case for measuring a temperature and level of the molten steel 33 in the mold 34 of a continuous casting machine. The temperature and level of the molten steel 33 in a tundish 31 can also be measured.

Figure 9:
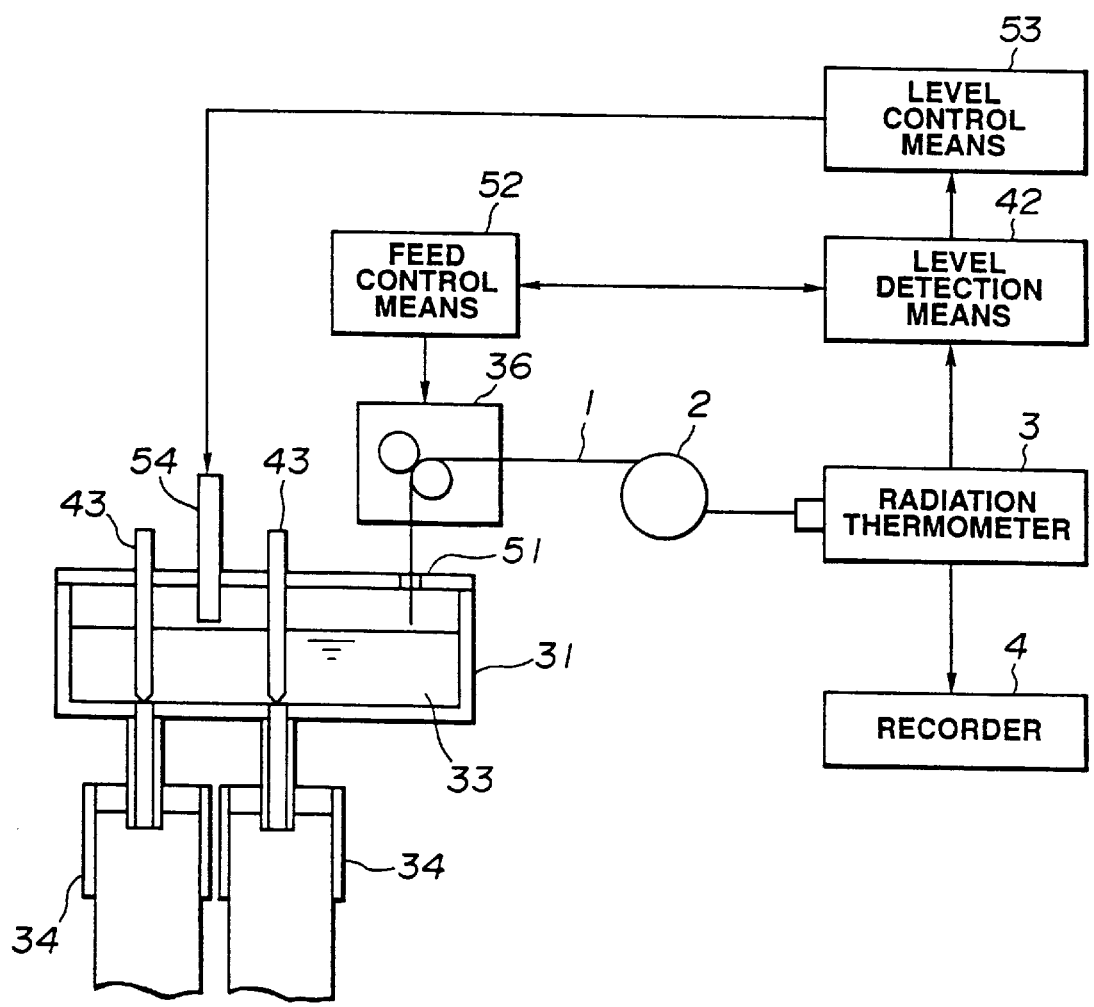
FIG. 9 illustrates a scheme of the present invention applied to a temperature and level measurement of molten steel in a tundish.

FIG. 9 illustrates a scheme for measuring the temperature and level of the molten steel 33 in a tundish 31. According to the figure, the metal-covered optical fiber 1 is inserted through a measurement hole 5 opened on a lid of the tundish 31 using fiber transfer means 36 at a constant speed, continuously or intermittently. When the tip of the metal-covered optical fiber 1 reaches the surface of the molten steel 33, the temperature output of the radiation thermometer 3 show a sudden change, as seen in FIG. 4, and the temperature saturates at the temperature of the molten steel 33. The sudden temperature change is detected by the level detection means 42. Then the level detection means 42 calculates to determine the level of the molten steel 33 in the tundish 31 based on the information of feed length of the metal-covered optical fiber 1, which information is transmitted from the feed control means 52. The level detection means 42 sends the computed level detection signal to level control means 53, and also sends it to the feed control means 52 to stop the feeding action of the fiber transfer means 36 to stop the immersing action of the metal-covered optical fiber 1. Once the temperature and level of the molten steel 33 are detected, the metal-covered optical fiber 1 is wound back by the fiber transfer means 36 to prepare for the next measurement cycle.

Following the procedure described above, the temperature and the level of the molten steel 33 in the tundish 31 are detected at the same time. Accordingly, the detection function significantly contributes to the automatization and stabilization of the tundish operation.

Figure 10:
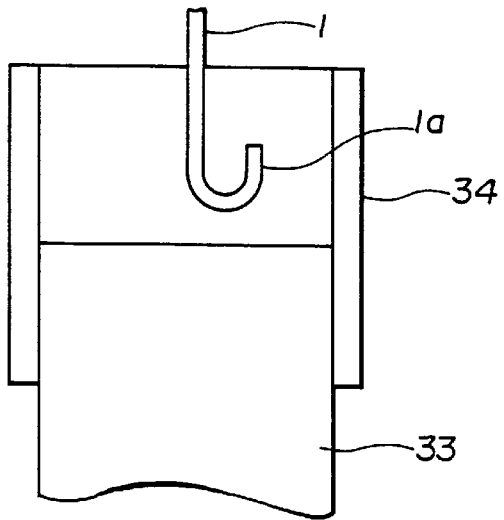
FIG. 10 is a front view of a covered optical fiber which is covered with a metallic tube in another embodiment of the present invention.

The above described examples deals with the tip of the metal-covered optical fiber 1 as the temperature measuring element in a straight shape. Nevertheless, as shown in FIG. 10, the tip of the metal-covered optical fiber 1 may be bent to have a near U-shape or can be bent to 90 degree or more to form a temperature measuring element 1a. Such a bent tip prevents direct incident radiation light emitted from the molten steel 33 into the tip during feeding stage of the metal-covered optical fiber 1 approaching toward the surface of the molten steel 33. That type of bent tip allows a more rapid temperature output rise in the radiation thermometer when the tip is immersed into the molten steel than in the case of straight tip, which results in a high accuracy detection of the temperature and the level of the molten steel 33.

The above described examples deal with the case for measuring the temperature and level of the molten steel 33 in a continuous casting process. The preferred mode of the present invention also measures the temperature and the level of the molten metal in other apparatus, and the invention is applicable for a wide range of uses.

As described in detail above, the present invention immerses the tip of a metal-covered optical fiber into a molten metal. Accordingly, the optical fiber itself including the core, can be immersed into the molten metal without suffering damage.

In addition, the present invention secures the heat resistance of the optical fiber by protecting the optical fiber with a metallic tube covering thereof and by forming the optical fiber with a quartz glass. Consequently, the present invention allows a stable measurement of temperature of the molten metal.

When the tip of the metal-covered optical fiber is immersed into a molten metal, the cover metal tube and the tip of the optical fiber attain the same temperature as that of the molten metal.

As a result, the emitted radiation light depends only on the temperature, so the temperature of the molten metal can be determined rapidly and precisely.

By adding level detection means, the level of the molten metal is also determined based on the data of the feed length of the metal-covered optical fiber and the temperature change measured by a radiation thermometer. The level information largely contributes to the automatization and stabilization of process operation.

Furthermore, by bending the tip of the metal-covered optical fiber to have a near U-shape, the radiation light of the molten metal can be prevented from directly entering to the tip of the optical fiber at the immersing stage of the metal-covered optical fiber, which assures an accurate detection of temperature and level of the molten metal.

And since the radiation light is transmitted through the metal-covered optical fiber, a stable measurement can be carried out without suffering from the effects of noise.

Embodiment-2

A consumable optical fiber temperature measuring device of the present invention comprises an optical fiber covered with a protective tube and an insulation coating on the outer surface of the protective tube to form a double-covered optical fiber. A tip of the double-covered optical fiber is used as a temperature measuring element, the optical fiber has a temperature of corrosion point higher than the temperature of a molten metal being measured, and the protective tube and the insulation coating have a heat-resistant temperature lower than the temperature of the molten metal to be measured.

The protective tube is preferably a metallic tube having a higher heat resistant temperature than that of the insulation coating.

The consumable optical fiber temperature measuring device of the present invention further has optical fiber transfer means which sends the double-covered optical fiber intermittently to a surface of the molten metal, and has correction means which corrects a light energy obtained at an end of the optical fiber using an initial length of the optical fiber specified in advance, a loss per unit length of the optical fiber, and a change of feed length of the optical fiber detected by the optical fiber transfer means in every measuring cycle.

According to the present invention, the tip of the double-covered optical fiber, covered with a protective tube and an insulation coating, is immersed into the molten metal as the temperature measuring element. When the tip of double-covered optical fiber is immersed into the molten metal, the optical fiber is not damaged because it is covered with a protective tube.

In addition, the optical fiber has a temperature of corrosion point higher than the temperature of molten metal being measured, and both the protective tube and the insulation coating have a heat resistant temperature lower than the temperature of the molten metal. Accordingly, when a double-covered optical fiber is immersed into the molten metal, the tip of the double-covered optical fiber firstly burns out the outside insulation coating, then the protective tube burns out to expose the optical fiber. The exposed optical fiber receives the energy of incident light and detects the temperature of the molten metal.

In this manner, the protective tube is formed by a metallic tube having a higher heat resistant temperature than that of the insulation coating to give a delay time between the burning of the insulation coating at the tip and the melting of the protective tube. The successive burning and melting protects a tip of the optical fiber for a certain period to ensure the uniform temperature on the whole region of the tip of the optical fiber.

Accordingly, when the double-covered optical fiber is immersed into the molten metal, the tip of the optical fiber is melted degraded and consumed. As a result, if the double-covered optical fiber is continuously immersed into the molten metal, then the consumption of the optical fiber increases. Therefore, the double-covered optical fiber is intermittently immersed into the molten metal while sending, retracting and winding the optical fiber using optical fiber transfer means.

When the tip of the double-covered optical fiber is successively consumed, the total length of the optical fiber become short, and the transmission loss of the optical fiber decreases, which results in an increase of the energy of light taken out at the end of the optical fiber to yield an error. To compensate this negative effect, correction means is provided to correct a light energy obtained at an end of the optical fiber using an initial length of the optical fiber specified in advance, a loss per unit length of the optical fiber, and a change of feed length of the optical fiber detected by the optical fiber transfer means in every measuring cycle.

Figure 11:
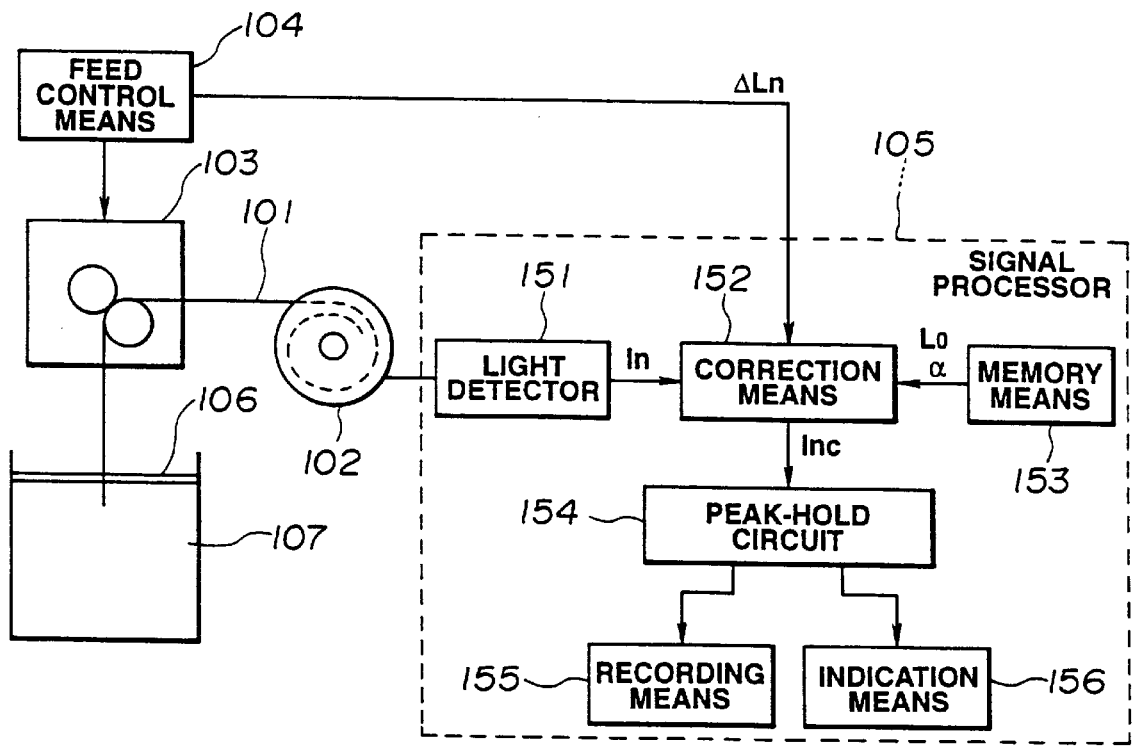
FIG. 11 illustrates another embodiment of the present invention.

FIG. 11 shows a schematic drawing of an example of the present invention. According to the drawing, the temperature measuring device to determine, for example, the temperature of molten steel comprises a double-covered optical fiber 101 coiled around a feed drum 102, optical fiber transfer means 103, feed control means 104, and a signal processor 105.

Figure 12:
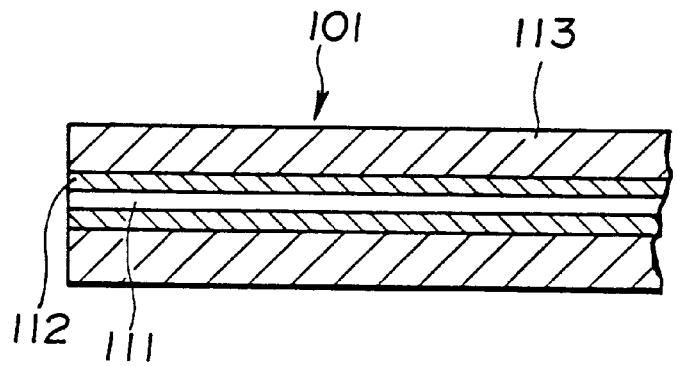
FIG. 12 shows a cross section of a double-covered optical fiber of the present invention.

The double-covered optical fiber 101 functions as a light wave guide and the temperature measuring element. The optical fiber 111 itself includes a core made of a quartz glass GI fiber. As seen in FIG. 12, the outside surface of the optical fiber 111 is coated by a UV cross-linked plastic material, which is then covered with a protective tube 112 made of stainless steel. The protective tube 112 is further covered with an insulation coating 113 of synthetic resin such as polyethylene or of glass fiber.

The optical fiber transfer means 103 sends the double-covered optical fiber 101 coiled around the feed drum 102 continuously or intermittently and immerses the tip of optical fiber 101 into the molten steel 107 from the top of the layer of powder 106. After a predetermined time has passed, the optical fiber transfer means 103 retracts the double-covered optical fiber 101 to take same up from the molten steel 107 by winding it. The feed control means 104 actuates intermittently while controlling a sending amount of optical fiber through the optical fiber transfer means 103.

A signal processor 105 comprises a light detector 151, correction means 152, memory means 153, a peak-hold circuit 154, recording means 155, and indication means 156. The light detector 151 generates electric signals proportional to the incident light power. The input section of the light detector 151 is connected to the end of the double-covered optical fiber 101. The memory means 153 stores the initial length Lo of the double-covered optical fiber 101 and the loss per unit length. The correction means 152 corrects the effect of change of transmission loss generated in the optical fiber 111 on the electric signals sent from the light detector 151 in every measurement cycle using the initial length $L_0$ of the double-covered optical fiber and the loss per unit length, both of which are stored in the memory means 153, and using the change ΔLn of the feed length of the double-covered optical fiber 101, which change is sent from the control means 104 at every measurement cycle, or the consumption of the tip of the double-covered optical fiber 101. The peak-hold circuit 154 detects the peak value of signals sent from the correction means 152 and holds the peak value for a specified time.

To conduct a temperature measurement of the molten steel 107 using a temperature measuring device having the structure described above, the initial length $L_0$ of the double-covered optical fiber 101 coiled around the feed drum 102 and the loss per unit length are measured in advance and stored in the memory means 153. Then, the double-covered optical fiber 101 is fed by the optical fiber transfer means 103 to immerse the tip of the double-covered optical fiber 101 into the molten steel 107 through the powder 106. If an ordinary optical fiber were immersed into the molten steel 107, when the tip of the ordinary optical fiber approaches the surface of the molten steel 107, the coating layer of the ordinary optical fiber would catch on fire, and the ordinary optical fiber itself snaps while passing through the powder 106. However, since the double-covered optical fiber 101 is covered with a protective tube 112 made of stainless steel and with an insulation coating 113, the insulation coating 113 requires a heat of vaporization when the tip of the double-covered optical fiber 101 passes through the powder 106, and it takes a long time before the insulation coating 113 is completely vaporized. As a result, the protective tube 112 is not damaged while the optical fiber is stably immersed into the molten steel 107.

Figure 13:
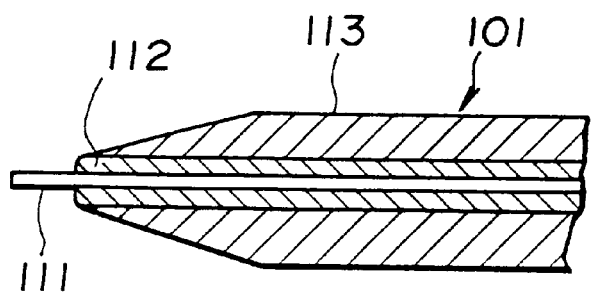
FIG. 13 shows a cross section of the double-covered optical fiber in a measuring state.

When the tip of the double-covered optical fiber 101 is immersed into the molten steel 107 having a temperature of, for example, 1500° C. or more, the temperature at the tip of the double-covered optical fiber 101 shows a sudden increase, and the strength of the insulation coating 113 at the tip suddenly decreases to begin the firing to degrade, and the protective tube 112 is gradually melted from the tip thereof. Since the protective tube 112 is formed from a stainless steel tube having a melting point of approximately 1400 to 1430° C., if the protective tube 112 is immersed into the molten steel 107 of 1500° C. or more, it begins to melt and the optical fiber 111 is gradually exposed as seen in the cross section of FIG. 13.

A light depending on the temperature of the molten steel 107 immediately enters the tip of the exposed optical fiber 101. The light is sent to the signal processor 105 through the double-covered optical fiber 101, where the light is converted to electrical signals, which are then converted to temperature.

Since the optical fiber 111 exposes from its tip when the tip of the double-covered optical fiber 101 is immersed into the molten steel 107 while waiting for a time lag to melt the insulation coating 113 and the protective tube 112, the tip of the optical fiber 111 can be maintained at a specified depth in the molten steel 107. Also since the optical fiber 111 comprises a quartz glass having a softening point of approximately 1600° C. which is higher than the temperature of the molten steel 107, the optical fiber 111 keeps its original shape for a certain time after the exposure. Consequently, the internal temperature of the molten steel 107 is determined promptly and accurately.

Figure 14:
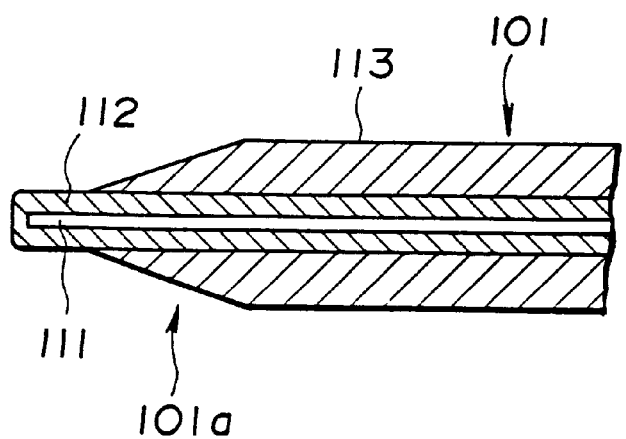
FIG. 14 shows a cross section of the double-covered optical fiber under a burnt-damage state.

If the tip of the optical fiber 111 which has been exposed is kept immersed in the molten steel 107, then the coating layer of the optical fiber 111 becomes gaseous in the ambient high temperature to gradually melt the optical fiber 111 from the tip thereof. Therefore, immediately after measuring the temperature of the molten steel 107, the tip of the double-covered optical fiber 101 is drawn out from the molten steel 107 using the optical fiber transfer means 103 to reduce the consumption of the optical fiber 111. The tip of the drawn-out double-covered optical fiber 101 increases its outside diameter nearly uniformly along the length of the optical fiber by burning out as shown in FIG. 14, and the tip of the protective tube 112 melts to cover the tip of the optical fiber 111. In this manner, the protective tube 112 and the insulation coating 113 remain at the tip of the double-covered optical fiber 101, and the protective tube 112 covers the tip of the optical fiber 111, so the optical fiber 101 easily penetrates the powder 106 at the next measuring cycle and immerses stably into the molten steel 107. Furthermore, the portion of the protective tube 112 which covers the tip of the optical fiber 111 immediately melts after immersing into the molten steel 107 to expose the double-covered optical fiber 111 and to prepare the measuring mode. As a result, the tip of the double-covered optical fiber 101 is not required to be machined at every measuring cycle and is applicable for determining the molten steel temperature repeatedly.

The following is an example of the state of tip of the double-covered optical fiber 101 during the measurement of the temperature of the molten steel 107.

The applied double-covered optical fiber 101 comprises quartz glass GI fiber. The 50/125/250 optical fiber 111 was coated with a UV cross-linked plastic material and further was covered with a protective tube made of stainless steel to form a metallic tube covered optical fiber having an outside diameter of 1.2 mm. The outside surface of the protective tube was coated with an insulation 113 made of polyethylene resin or made of a glass fiber to prepare a double-covered optical fiber having an outside diameter of 4 mm.

The tip of the prepared optical fiber was immersed into the molten steel 107 to a depth of approximately 200 mm, and held immersed for 2 sec. The intermittent repetition of the immersion was carried out to determine the temperature of the molten steel 107. After every measurement cycle, the tip of the immersed double-covered optical fiber was checked. The tip immersed into approximately 200 mm depth of the molten steel 107 remained having approximately 100 mm of the tip 101a in a conical shape after being taken out from the molten steel 107, which is shown in FIG. 14. The state indicated that, during the measurement for 2 sec, the tip of double-covered optical fiber 101 lost approximately 100 mm in its length by melting, but the tip was held in the molten steel 107 to measure the temperature of the inside of the molten steel 107, not of the temperature of the powder 106 on the molten steel 107.

Figure 15:
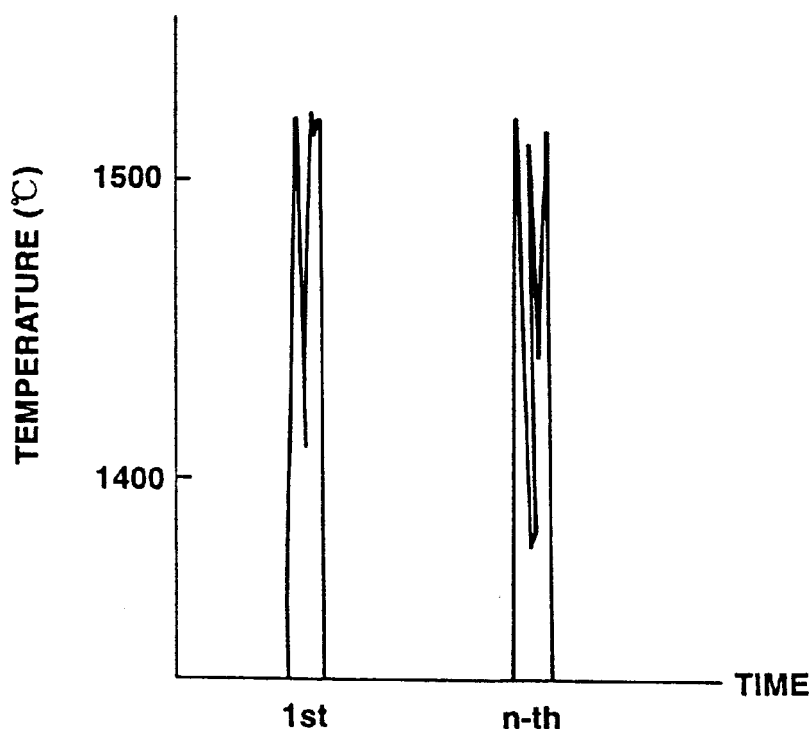
FIG. 15 shows an observed waveform.

As shown in FIG. 15, the difference of measured peak temperature in n times gave approximately 1° C., and the observed values in more than one measurement using a continuous thermometer followed well the actual temperature of molten steel 107 within about 1° C. FIG. 15 indicates a sudden fall of the temperature after reached to a peak value. The phenomenon shows that the tip of the optical fiber 101 is exposed to be melted and to thus expose a fresh tip portion.

Figure 16:
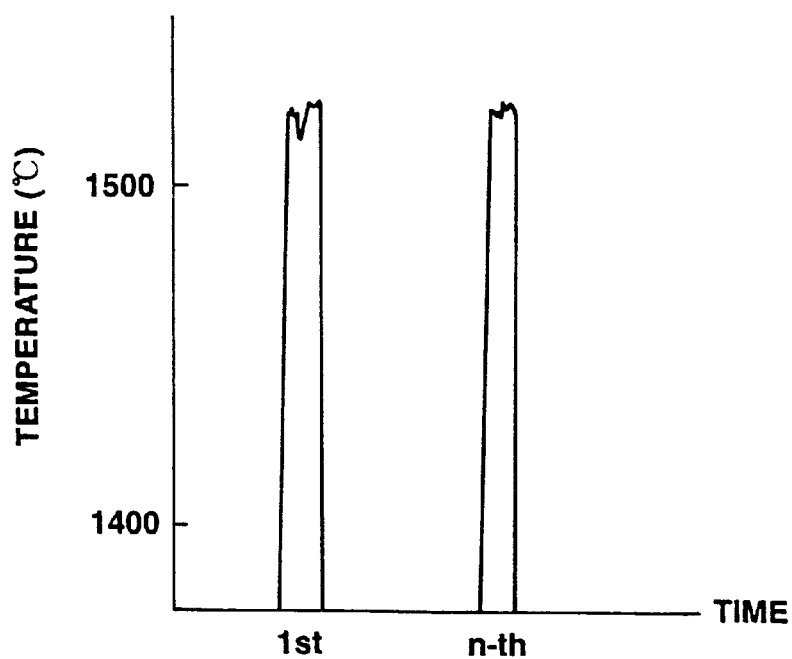
FIG. 16 shows an observed waveform.

FIG. 16 shows an observed result when the tip of the double-covered optical fiber 101 was immersed into the molten steel 107 to a depth of approximately 200 mm and held for 1 sec. and when the immersion was repeated intermittently. The repeated immersion of the tip of the double-covered optical fiber 101 into the molten steel 107 for 1 sec. accurately followed the actual temperature change of the molten steel 107 determined by a continuous thermometer, and the tip length of the double-covered optical fiber 101 consumed in every measurement was in a range of from 10 to 20 mm. Consequently, an accurate temperature measurement within a short time and a minimized melt consumption length of the double-covered optical fiber 101 were achieved.

Repeated immersion of the double-covered optical fiber 101 into the molten steel 107 to determine the temperature of the molten steel 107 as described above shortens the total length of the double-covered optical fiber 101 because of the repeated melting at the tip of double-covered optical fiber 101. In this way, when the total length of the double-covered optical fiber 101 is shortened, the transmission loss of the optical fiber 111 becomes small, and the light energy generated from the end of the optical fiber 111 increases, which yields an error in the observed value. To cope with this phenomenon, the light energy generated from the end of the optical fiber 111 is sent to the light detector 151 of the signal processor 105, and the light energy which enters the light detector 151 is converted into an electric current signal, In, proportional to the power of the entered energy and is sent to the correction means 152. The correction means 152 corrects the received electric current signal, In, using the initial length, Lo, of the optical fiber 111 and the loss, $\alpha$, per unit length, both of which are stored in the memory means 153, and using the change of feed length, Ln, of optical fiber in every measurement, which is sent from the feed control means 104. The corrected value, Inc, which removed the change of transmission loss, is sent to the peak-hold circuit 154. The peak-hold circuit 154 maintains the received peak value of the correction value, Inc, for a predetermined period and sends the peak value to the indication means 156 and also records the peak value in the recording means 155.

Figure 17:
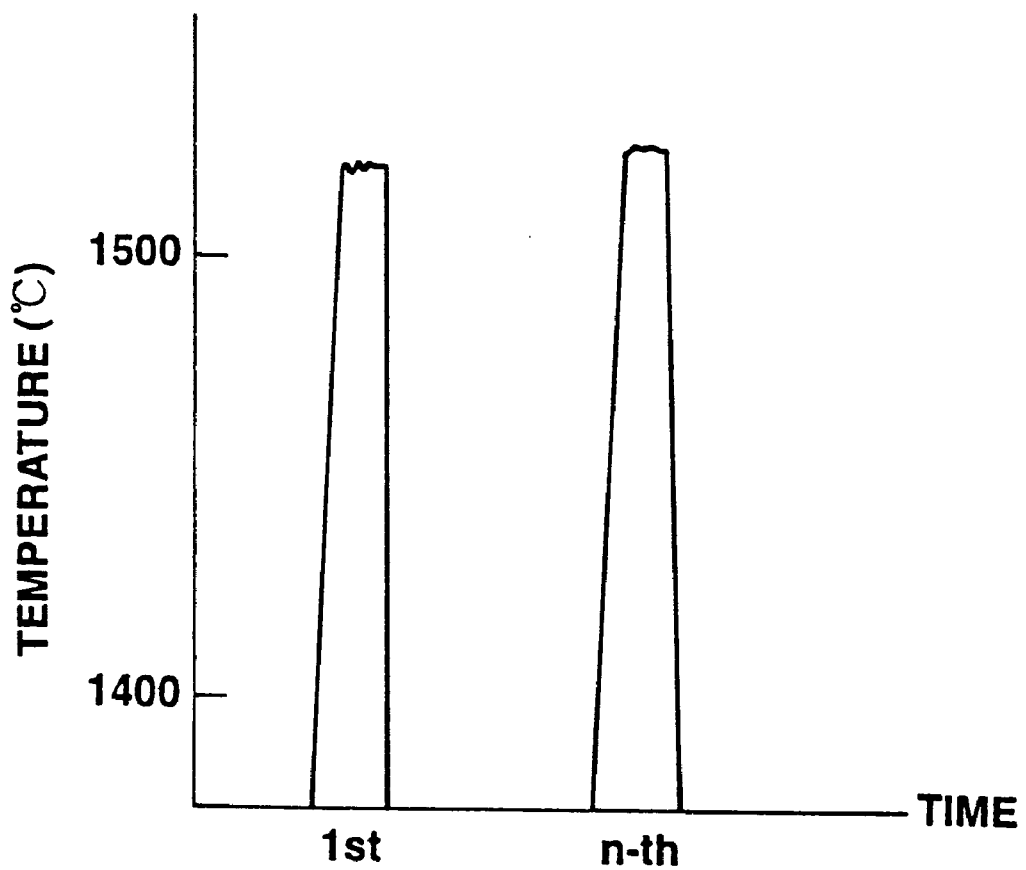
FIG. 17 shows a waveform indicating observed values under a peak-hold mode.

In such a manner as described above, the change of transmission loss in the optical fiber 111 is corrected by correction means 152. Accordingly, even when the tip of the double-covered optical fiber 101 is consumed, the generation of error of measured temperature is prevented, and the stable temperature measurement of molten steel 107 for a long period is ensured. Also when the peak value of the corrected observed value, Inc, is held for a specified period, 1 sec. for example, the observed temperature values can be indicated surely on the indication means 156 and the recording means 155, which is illustrated in FIG. 17. Furthermore, by detecting and holding the peak value of the observed value Inc, the time for immersing the tip of the double-covered optical fiber 101 into the molten steel 107 is reduced, which in turn enables a long period of measurement with a single double-covered optical fiber 101.

The above-described example deals with a case that uses the optical fiber 111 made of quartz glass and the protective tube 112 made of stainless steel to measure the temperature of the molten steel as high as 1500° C. or more. Nevertheless, a temperature at around 1000° C. may be measured using the optical fiber 111 made from a multi-component glass having a softening temperature of approximately 1000° C. and covering the optical fiber 111 with a synthetic resin insulation 113.

As detailed above, the present invention assures a stable immersion of the optical fiber into the molten metal without damaging the optical while functioning the tip of the optical fiber as the temperature measuring element because the optical fiber is covered with the protective tube.

In addition, since the employed optical fiber has a melt-damaging temperature higher than the temperature of the molten metal being measured and since the heat-resistant temperature of both the protective tube and the insulation coating is lower than the temperature of the molten metal, a time lag is secured between the time of immersing the double-covered optical fiber into the molten metal and the time of exposing the tip of the optical fiber, which ensures the holding of the tip of optical fiber in the molten metal for a prompt and accurate measurement of the inside temperature of the molten metal.

Furthermore, since the protective tube is prepared with a metallic tube having higher heat resistant temperature than that of the insulation coating, a delay time is secured after the burn-out of the insulation coating at the tip until the burn-out of the protective tube, which protects the tip of the optical fiber and which makes the whole area of the tip of the optical fiber uniform in temperature.

Also since the optical fiber is protected by the protective tube and the insulation coating, the amount of melt-out at the tip is minimized when the double-covered optical fiber is immersed into the molten metal. Therefore, even when the double-covered optical fiber is immersed intermittently into the molten metal, the consumption of the tip of double-covered optical fiber is reduced. As a result, a single double-covered optical fiber performs a long period of measurement.

With a correction of the change of transmission loss caused from the consumption of the tip of double-covered optical fiber, the generation of error in the observed temperature can be prevented even when the tip of double-covered optical fiber is consumed. The correction also assures a stable and long period of temperature measurement of molten metal.

Embodiment-3

The double-covered optical fiber of the present invention has a protective tube on the optical fiber, and further has an insulation coating covering the protective tube, which insulation coating contains particles having a melting point higher than the temperature of a target material.

The particles of high melting point may include carbon particles.

Furthermore, the double-covered optical fiber of the present invention has a metallic protective tube thereon, and further has an insulation coating comprising cellulose covering the protective tube.

The insulation coating is made of paper.

For example, carbon (graphite) is an element of the highest melting point group as high as above 3,500° C. When an insulation material containing the carbon particles as the additive is immersed into a molten metal, the carbon particles do not burn because they can not receive oxygen and leave a charcoal layer on the protective tube after the insulation material melts in the molten metal. The remaining charcoal layer provides an insulation effect to suppress the melt-loss of the protective tube. In addition, a metal having a high temperature durability helps to maintain the flexural strength of the optical fiber.

In this way, an insulation coating containing particles as the additive having a temperature of melting point higher than the temperature of the target material reduces the consumption of the optical fiber and maintains the strength of the protective tube, which enables determination of temperature inside of (deep in) the molten metal.

Also when an insulation material comprising cellulose is immersed into a molten metal, the heat-receiving condition without accompanying oxidation is established. As a result, a carbon structure is left after the melting-out of the insulation material to remain on the surface of the protective tube as charcoal. The charcoal provides an effect of heat insulation to suppress the damage of the protective tube. In addition, a metal having a high temperature durability helps to maintain the flexural strength of the optical fiber.

Following the procedure, the insulation coating comprising cellulose component reduces the consumption of the optical fiber and maintains the strength of the protective tube to enable the measurement to be performed inside of (deep into) the molten metal.

EXAMPLE 1

Figure 18:
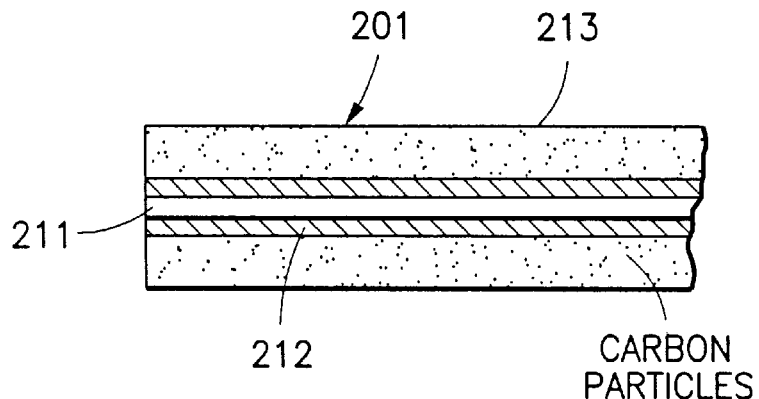
FIG. 18 shows a cross section of the double-covered optical fiber of the present invention.

FIG. 18 shows a cross section of a fiber of Example 1 of the present invention. The reference number 201 designates the double-covered optical fiber. The double-covered optical fiber 201 comprises a 50/125 optical fiber 211 made of GI fiber, a quartz glass, coated with polyimide, a protective tube 212 made of stainless steel having 1.4 mm of outer diameter and 1 mm of inner diameter covering the optical fiber 211, and an insulation coating 213 made from polyethylene resin containing carbon particles as the additive at a rate of approximately 3% covering the surface of the protective tube 212.

Figure 21:
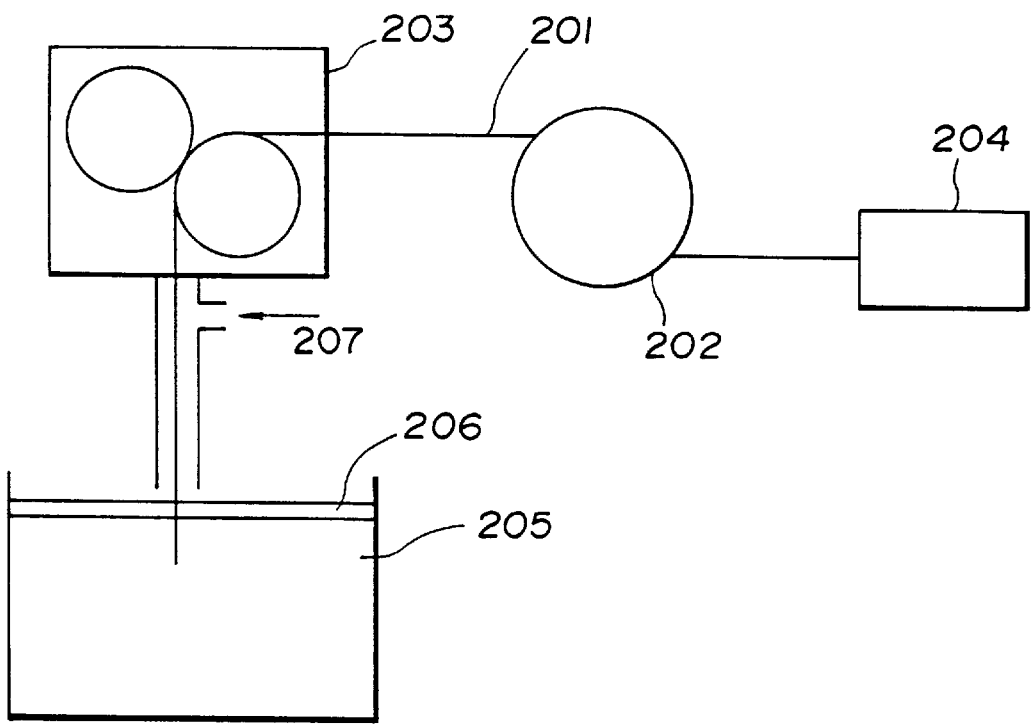
FIG. 21 illustrates a schematic diagram of temperature measuring device using the double-covered optical fiber of the present invention.

For example, as illustrated in FIG. 21, a temperature measuring device to determine the temperature of the molten steel is structured by the double-covered optical fiber 201 which is coiled around a feed drum 202 and which is used as both the light guide and the temperature measuring element, optical fiber transfer means 203, and a signal processor 204. Purging with an inert gas 207 is applied surrounding the double-covered optical fiber near to the molten steel surface to perform a maximum effect of the heat-resistant covering of the double-covered optical fiber 201 and to prevent burning the cover material.

With the temperature measuring device having the above-described structure, the temperature of the molten steel is determined. When the tip of the double-covered optical fiber 201 is immersed into the molten steel 205 through the powder 206, the insulation coating 213 melts during the tip of the double-covered optical fiber 201 passes through the powder 206 while leaving a charcoal layer on the surface of the protective tube 212 because the optical fiber 211 is covered with the protective tube 212 made of stainless steel and with the insulation coating 213 comprising polyethylene containing carbon particles as the additive at a rate of approximately 3%. The remaining charcoal layer provides a heat insulation effect to protect the protective tube 212 from heat, so the optical fiber 211 can be immersed into the molten steel 205 stably.

On the contrary, in the case of an insulation coating made from ordinary polyethylene which contains no carbon particles, the insulation coating melts out on passing through the powder to expose the protective tube 212. As a result, compared with the case of the present example which uses the insulation coating 213 made from polyethylene containing carbon particles as the additive, the speed of melting the protective tube is high, and such an of the optical fiber 211 can not be immersed stably into a sufficient depth. This is because the protective tube having degraded flexural strength can not endure the pressure of the molten steel 205 and can not be immersed into the molten steel 205, and because the amount of melt-loss is excessive even when the optical fiber 211 is immersed into the molten steel 205.

Figure 19:
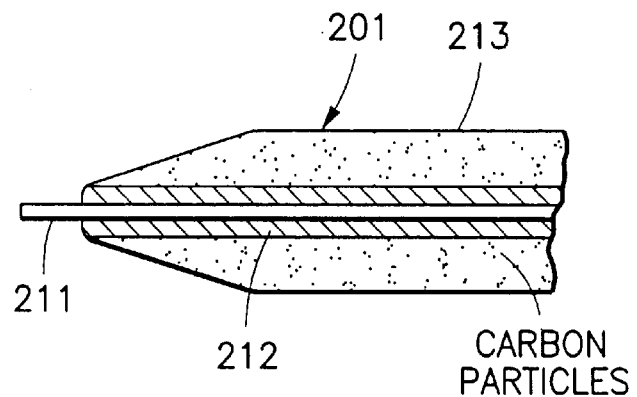
FIG. 19 shows a cross section of the double-covered optical fiber under a measuring state.

When the double-covered optical fiber 201 using the insulation coating 213 containing carbon particles as the additive is immersed into the molten steel at 1500° C. or more, the temperature of the tip of the double-covered optical fiber 201 shows a sudden rise, and the insulation coating 213 at the tip is melted out to leave a thin charcoal layer on the surface of the protective tube 212. Since the protective tube 212 is formed by a stainless steel having a melting point in an approximate range from 1400 to 1430° C., the area where is not insulated by the charcoal insulation layer receives heat to gradually melt from the tip, and the optical fiber 211 gradually exposes from the tip as shown in the cross section in FIG. 19.

The tip of the optical fiber 211 which has been exposed immediately receives the light depending on the temperature of the molten steel 205. The incident light is sent to the signal processor 204 via the double-covered optical fiber 211 and is converted to temperature.

When the insulation coating 213 containing carbon particles as the additive is used, there appears a time lag between the time of immersing the tip of the double-covered optical fiber 201 into the molten steel 205 and the time of melting the protective tube 212 until the optical fiber 211 exposes. So the tip of the optical fiber 211 is secured at a specified depth in the molten steel 205. Since the optical fiber 211 is made from a quartz glass having a softening point at approximately 1600° C. which is higher than the temperature of the molten steel 205, the optical fiber 211 maintains the original shape for a certain period even after it is exposed. Therefore, the internal temperature of the molten steel 205 can be determined promptly and accurately.

Figure 20:
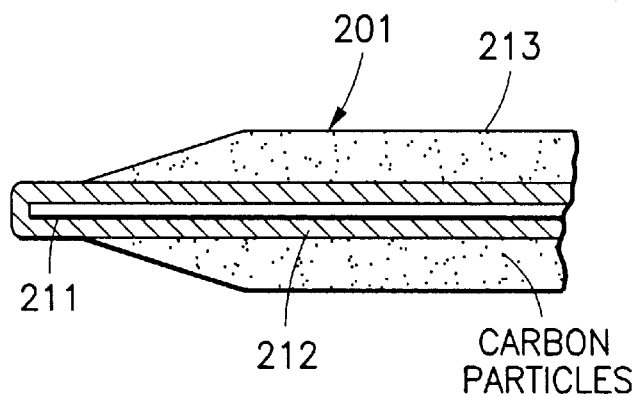
FIG. 20 shows a cross section of the double-covered optical fiber under a measuring state.

After the measurement, the double-covered optical fiber 201 is drawn out from the molten steel 205. The tip of the protective tube 212 is melted to cover the tip of optical fiber 211, which is shown in FIG. 20. In such a manner, the protective tube 212 and the insulation coating 213 remain at the tip of the double-covered optical fiber 201, and the protective tube 212 covers and protects the tip of optical fiber 211. Accordingly, the optical fiber 211 can be immersed deep into the molten steel 205 at next measuring cycle.

An example is referred to observe the state of the tip of the double-covered optical fiber 201 on measuring the temperature of the molten steel 205. The double-covered optical fiber 201 comprises a 50/125 optical fiber 211 comprises a quartz glass GI fiber coated with polyimide, a protective tube 212 made of stainless steel having 1.4 mm of outer diameter and 1 mm of inner diameter covering the optical fiber 211, and an insulation coating 213 made from polyethylene resin containing carbon particles as the additive at a rate of approximately 3% covering the surface of the protective tube 212.

The tip of double-covered optical fiber 201 was immersed into the molten steel 205 at 1550° C. to a depth of approximately 200 mm and held there for 1 sec. The measurement was repeated intermittently. In every measurement, the shape of the tip of the double-covered optical fiber 201 was observed and it was found that the tip immersed into the molten steel 205 to a depth of approximately 200 mm achieved a shape as shown in FIG. 20, and was left with a length of approximately 160 mm. During 1 sec. of measurement, it was found that the tip of the double-covered optical fiber 201 lost about 40 mm in length but the tip was held in the molten steel 205, not in the powder 206 above the molten steel, and the inside temperature of the molten steel 205 was measured.

Next, to clarify an effect of the present example, the double-covered optical fiber 201 of the example using the insulation coating 213 composing polyethylene containing about 3% of carbon particles as the additive was compared with the double-covered optical fiber using an insulation coating composing ordinary polyethylene containing no carbon particle.

Figure 22:
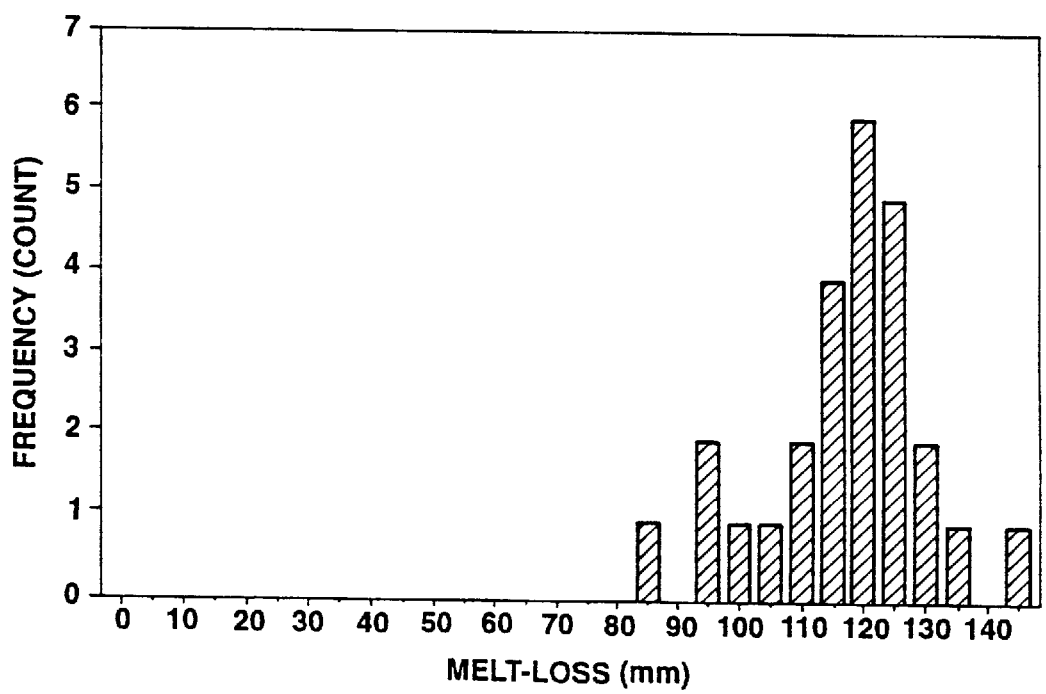
FIG. 22 is a frequency distribution showing a melt-loss in the case of an ordinary insulation coating containing no carbon particles.
Figure 23:
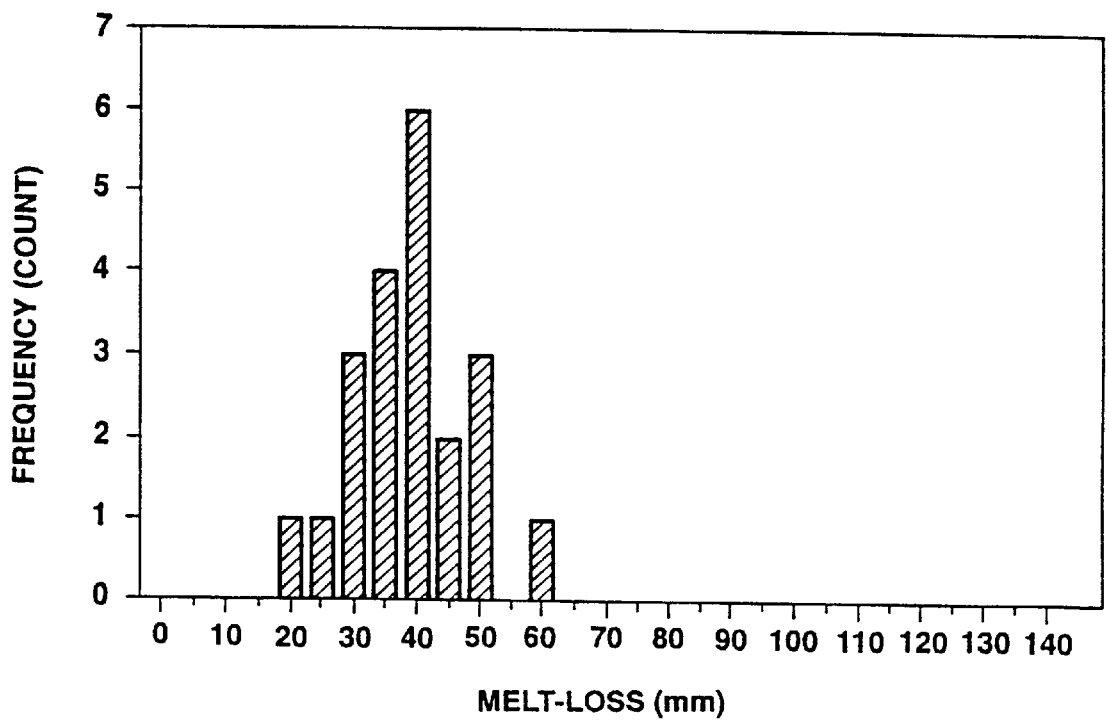
FIG. 23 is a frequency distribution showing a melt-loss in the case of an insulation coating containing carbon particles.

FIG. 22 and FIG. 23 show the melt-loss of the optical fiber when the tip of the double-covered optical fiber was repeatedly immersed into the molten steel 205 at 1550° C. to a depth of 200 mm and held there for 1 sec. FIG. 22 indicates the melt-loss in the case of an insulation coating of ordinary polyethylene without containing carbon particle additive. FIG. 23 shows the melt-loss in the case of an insulation coating polyethylene containing approximately 3% of carbon particles as the additive.

The melt-loss of the case using an insulation coating of ordinary polyethylene containing no carbon particle was approximately 120 mm. The melt-loss of the case using the insulation coating of polyethylene containing carbon particles at approximately 3% as the additive was approximately 40 mm, which showed a significant difference in each of the cases. The comparison confirmed the superiority of the polyethylene containing carbon particles as the additive.

Figure 24:
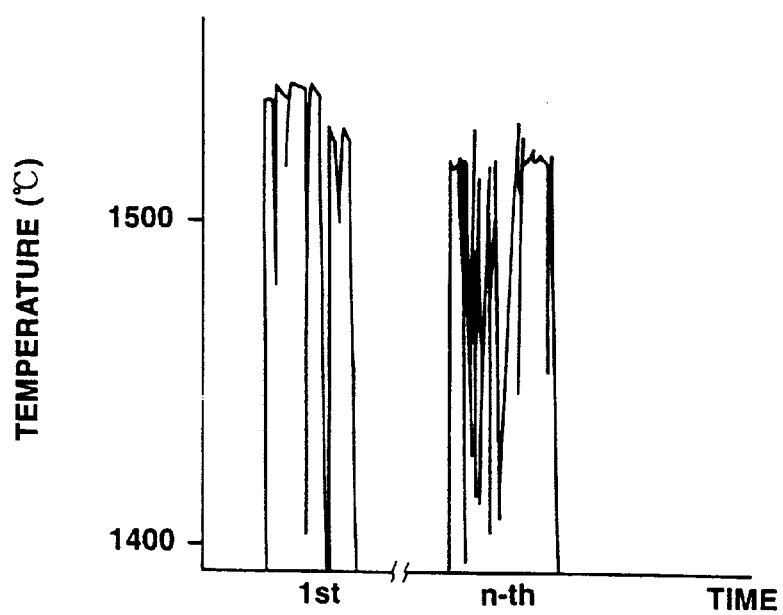
FIG. 24 is a waveform diagram showing a temperature determined with the ordinary insulation coating containing no carbon particles.
Figure 25:
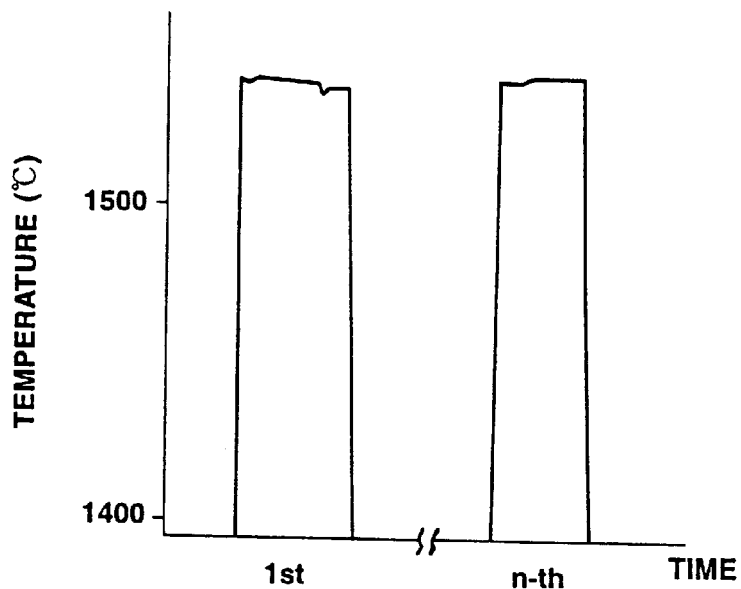
FIG. 25 is a waveform diagram showing a temperature determined with the insulation coating containing carbon particles.

FIG. 24 and FIG. 25 show an observed waveform when the tip of double-covered optical fiber was repeatedly immersed into the molten steel 205 to a depth of approximately 200 mm and held there for 1 sec. FIG. 24 is drawn in the case of the insulation coating of ordinary polyethylene without containing any carbon particle additive. FIG. 25 shows the melt-loss in the case of the insulation coating of polyethylene containing approximately 3% of carbon particles as the additive. As shown in FIG. 24, there were observed several occurrences of sudden decrease of measured value. The phenomenon indicates the temperature change occurred at the time of melting out of the tip of the exposed optical fiber to expose a new tip portion. On the other hand, FIG. 25 shows a stable plateau, which indicates that the optical fiber 211 was well protected and that the measurement was conducted at a stable position.

Figure 26:
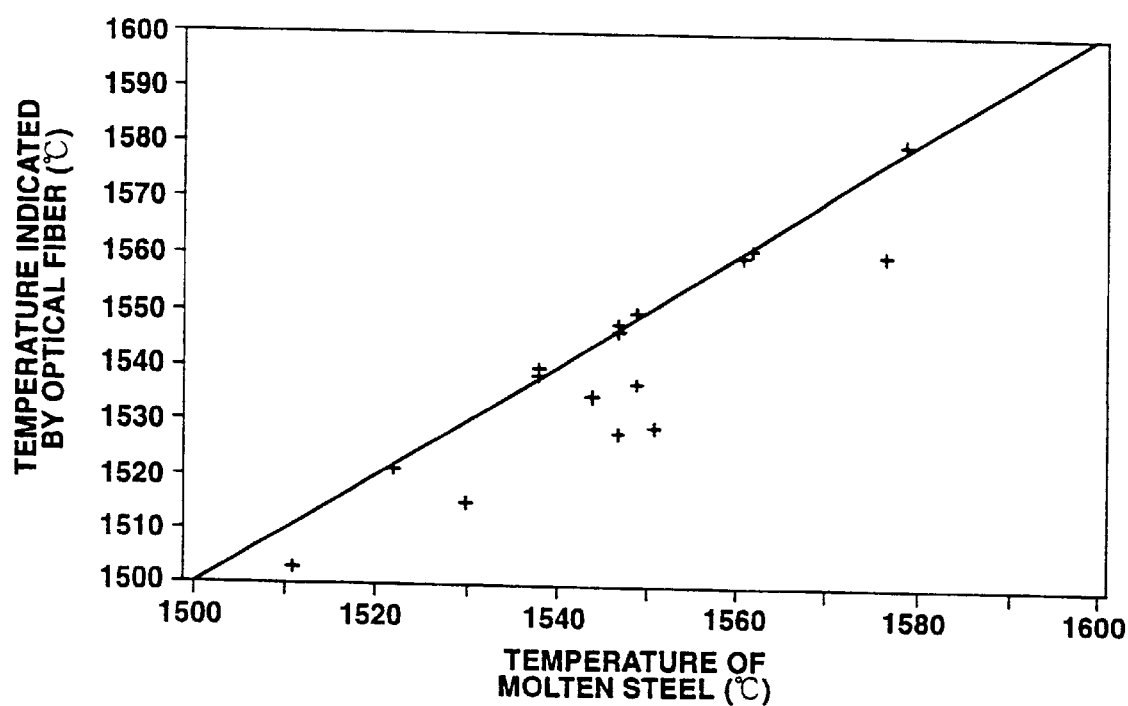
FIG. 26 shows a relation between the temperature of molten steel and the temperature measured using a double-covered optical fiber with the ordinary insulation coating containing no carbon particles.
Figure 27:
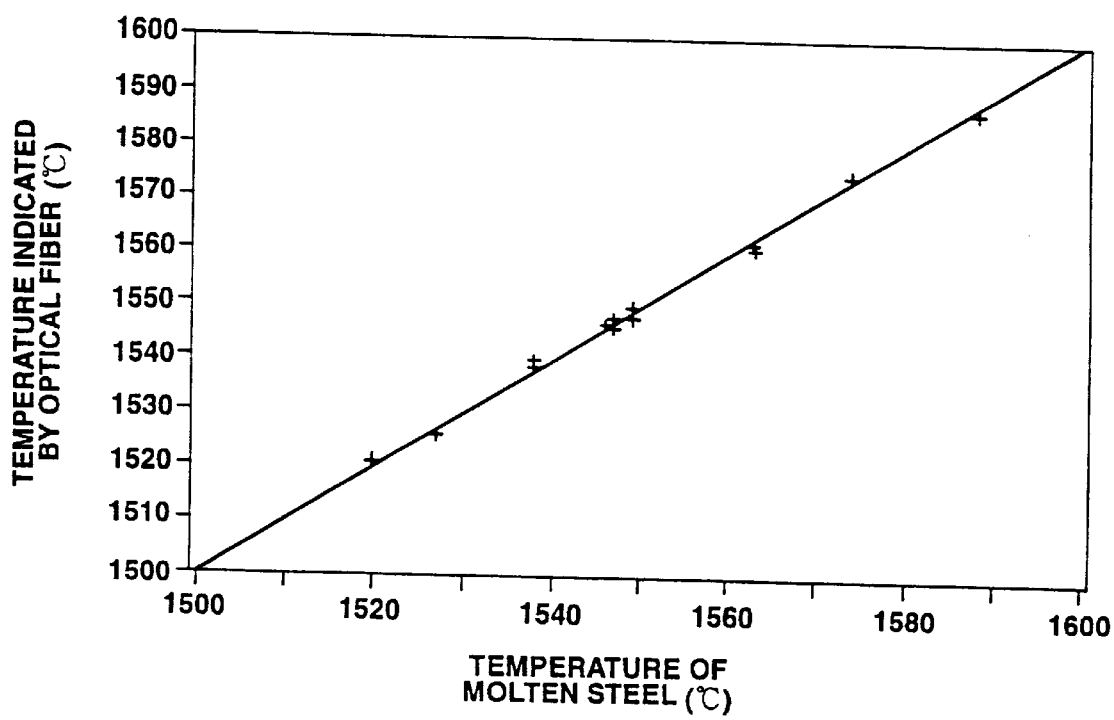
FIG. 27 shows a relation between the temperature of molten steel and the temperature measured using a double-covered optical fiber with the insulation coating containing carbon particles.

Then, the tip of the double-covered optical fiber was immersed into the molten steel 205 which was varied its temperature in a range from 1500 to 1600° C. to a depth of approximately 200 mm and held there for 1 sec. The intermittently repeated measurement was carried out, and the results are given in FIG. 26 and FIG. 27. FIG. 26 is drawn in the case of the insulation coating of ordinary polyethylene without containing any carbon particle additive. FIG. 27 shows the melt-loss in the case of the insulation coating polyethylene containing approximately 3% of carbon particles as the additive.

Referring to FIG. 26, there often appeared a temperature indication lower than the actual molten steel by nearly 20° C. The presumed cause of the phenomenon is that the tip of the double-covered optical fiber 201 lost its insulation coating before reaching to a sufficient depth during the process of immersing the double-covered optical fiber 201 into the molten steel 205 and that the protective tube 212 was directly exposed to the molten steel 205 to lose its strength and that the tip could not reach a sufficient depth and the correct temperature of molten steel 205 was not able to be measured.

To the contrary, in the case of using the insulation coating 213 comprising polyethylene containing carbon particles as the additive, which is shown in FIG. 27, there was attained nearly completely stable measurement of correct temperature.

With the above temperature measurement results, the superiority of the insulation containing carbon particles as the additive was confirmed.

The above example uses the insulation coating comprising polyethylene containing carbon particles at about 3 wt. % as the additive. Nevertheless, an insulation coating of polyethylene containing carbon particles at about 5 wt. % gives similar effect with the 3 wt. % case. If the bending characteristics of the optical fiber on coiling around the drum is not required to consider, the content of the carbon particles may be increased further.

EXAMPLE 2

Example 2 used a heat-shrink tube made of polyethylene containing carbon particles as the additive as an insulation coating of the double-covered optical fiber. The following is the description of the structure of the double-covered optical fiber of Example 2.

The double-coated optical fiber comprised a 50/125 optical fiber 211 made of a quartz glass GI fiber coated with polyimide, a protective tube 212 made of stainless steel having 1.4 mm of outer diameter and 1 mm of inner diameter covering the optical fiber 211, and a heat-shrink tube made from polyethylene resin containing carbon particles as the additive covering the surface of the protective tube 212 to form the double-covered optical fiber with outside diameter of approximately 4 mm.

The tip of the double-covered optical fiber was immersed into a molten steel at a temperature ranging from 1400 to 1600° C. to a depth of approximately 200 mm and held there for 1 sec. The measurement was repeated intermittently. In every measurement, the shape of the tip of double-covered optical fiber was observed to find that a tip having a shape similar to FIG. 20 remained and that the melt-loss at the tip of the double-covered optical fiber was approximately 30 mm, which was similar in effect to the case using an insulation coating of polyethylene containing approximately 3% of carbon particles and that the tip was immersed to a sufficient depth to determine correct temperature of the molten steel using a temperature measuring device employing the double-covered optical fiber.

From the above results, also with a double-covered optical fiber using an insulation coating of polyethylene heat shrink tube, it was confirmed that the temperature of the molten steel at a sufficient depth can be measured with a reduced consumption of the optical fiber in every measurement.

EXAMPLE 3

Examples 1 and 2 dealt with an optical fiber 211 made from quartz glass and a protective tube 212 made of stainless steel to measure a temperature of the molten steel at approximately 1500° C. However, a temperature at around 1000° C. could be measured by using an optical fiber made from multi-component glass having a softening point of 1000° C. or below covered with an insulation coating containing carbon particles as the additive.

EXAMPLE 4

Example 4 used an optical fiber covered with a metallic tube, which was further covered with a paper tape winding thereon. The structure of the double-covered optical fiber was a 50/125 optical fiber 211 comprising a quartz glass GI fiber coated with polyimide, a protective tube 212 which had 1.4 mm of outer diameter and 1 mm of inner diameter and which was made of stainless steel to cover the optical fiber 211, α a paper tape was used as the insulation coating wound around the protective tube 212.

The prepared double-covered optical fiber was immersed into the molten steel at a temperature of 1400 to 1600° C. to a depth of 200 mm, and the state of the tip of double-covered optical fiber was observed. The portion immersed into the molten steel left soot-like charcoal on the surface of the metallic tube, and approximately 50 mm length at the tip was melted out. In the case that an optical fiber covered with a metallic tube without using an insulation coating was immersed into the molten steel, nearly all the portion immersed into the molten steel was melted out.

From the observation described above, it was confirmed that the double-covered optical fiber using an insulation coating consisting of cellulose performed the measurement of temperature at a sufficiently deep zone of a molten metal with a reduced amount of melt-loss in every measurement cycle.

As described in detail above, since the double-covered optical fiber of the present invention employs a metallic protective tube on the optical fiber and the insulation coating containing particles having a melting point higher than the temperature of target material or an insulation coating comprising cellulose, the double-covered optical fiber gives a reduced amount of melt-loss to decrease the cost of measurement even when it is applied to the molten metal system.

Also since the metallic protective tube has a sufficient strength, the double-covered optical fiber of the present invention allows to measure a temperature at a deep zone in the molten metal for determining a correct temperature.

What is claimed is:

1. A temperature measuring device comprising:
   (a) an optical fiber;
   (b) a metallic protective tube covering the optical fiber, the metallic protective tube having a melting point no greater than a temperature of a molten metal whose temperature is measured;
   (c) a heat insulation coating having a melting point lower than the temperature of the molten metal whose temperature is measured, the heat insulation coating covering the metallic protective tube such that the optical fiber is covered with the metallic protective tube and the heat insulation coating to form a double-covered optical fiber; and
   (d) a radiation thermometer connected to the double-covered optical fiber;
   wherein said heat insulation coating contains carbon particles as an additive, the carbon particles having a higher melting point than the temperature of the molten metal whose temperature is measured, and wherein a tip of the double-covered optical fiber forms a temperature measuring element for collecting and transmitting radiation to the radiation thermometer.

2. The temperature measuring device of claim 1, wherein said optical fiber comprises quartz glass.

3. The temperature measuring device of claim 1, wherein said metallic protective tube comprises stainless steel.

4. The temperature measuring device of claim 1, wherein said heat insulation coating comprises a polyethylene coating containing the additive carbon particles.

5. The temperature measuring device of claim 1, wherein said heat insulation coating comprises a polyethylene tube containing the additive carbon particles and having a thermal shrinkage property.

6. The temperature measuring device of claim 1, wherein said heat insulation coating comprises cellulose.

7. The temperature measuring device of claim 6, wherein said heat insulation coating comprises paper.

8. The temperature measuring device of claim 1, wherein said insulation coating contains the additive carbon particles in an amount of about 3–5 wt %.

9. The temperature measuring device of claim 1, wherein said heat insulation coating comprises a synthetic resin containing the additive carbon particles.

* * * * *